US007966188B2

(12) United States Patent
Ativanichayaphong et al.

(10) Patent No.: US 7,966,188 B2
(45) Date of Patent: Jun. 21, 2011

(54) METHOD OF ENHANCING VOICE INTERACTIONS USING VISUAL MESSAGES

(75) Inventors: Soonthorn Ativanichayaphong, Boca Raton, FL (US); David Jaramillo, Boca Raton, FL (US); Gerald McCobb, Delray Beach, FL (US); Leslie R. Wilson, Boca Raton, FL (US)

(73) Assignee: Nuance Communications, Inc., Burlington, MA (US)

( * ) Notice: Subject to any disclaimer, the term of this patent is extended or adjusted under 35 U.S.C. 154(b) by 1006 days.

(21) Appl. No.: 10/441,839

(22) Filed: May 20, 2003

(65) Prior Publication Data
US 2004/0236574 A1    Nov. 25, 2004

(51) Int. Cl.
G10L 11/00    (2006.01)
G10L 21/00    (2006.01)
(52) U.S. Cl. .............. 704/275; 704/270; 704/270.1
(58) Field of Classification Search ........... 704/270–275
See application file for complete search history.

(56) References Cited

U.S. PATENT DOCUMENTS

| | | | | |
|---|---|---|---|---|
| 4,707,857 A | * | 11/1987 | Marley et al. .............. | 704/243 |
| 4,864,622 A | * | 9/1989 | Iida et al. .................. | 704/247 |
| 5,491,774 A | * | 2/1996 | Norris et al. ............... | 704/270 |
| 5,562,453 A | * | 10/1996 | Wen ........................... | 434/185 |
| 5,577,165 A | | 11/1996 | Takebayashi et al. | |
| 5,612,869 A | * | 3/1997 | Letzt et al. ................ | 705/3 |
| 5,774,841 A | * | 6/1998 | Salazar et al. ............. | 704/225 |
| 5,802,526 A | | 9/1998 | Fawcett et al. | |
| 5,839,108 A | * | 11/1998 | Daberko et al. ........... | 704/270 |
| 5,878,274 A | | 3/1999 | Kono et al. | |
| 5,892,813 A | | 4/1999 | Morin et al. | |
| 5,983,186 A | * | 11/1999 | Miyazawa et al. ......... | 704/275 |
| 6,012,030 A | * | 1/2000 | French-St. George et al. .......................... | 704/275 |
| 6,018,711 A | | 1/2000 | French-St. George et al. | |
| 6,023,688 A | * | 2/2000 | Ramachandran et al. .... | 705/44 |
| 6,041,300 A | * | 3/2000 | Ittycheriah et al. ......... | 704/255 |
| 6,052,439 A | | 4/2000 | Gerszberg et al. | |
| 6,070,796 A | | 6/2000 | Sirbu | |
| 6,091,805 A | | 7/2000 | Watson | |
| 6,173,266 B1 | * | 1/2001 | Marx et al. ................ | 704/270 |
| 6,343,269 B1 | * | 1/2002 | Harada et al. .............. | 704/243 |

(Continued)

FOREIGN PATENT DOCUMENTS
EP    0163511    12/1985
(Continued)

OTHER PUBLICATIONS

Takebayahsi, Y., "Spontaneous Speech Dialogue System Tosburg II—The User-Centered Multimodal Interface", Scripta Technica, Inc., vol. 26, No. 14, pp. 77-91, (1996).

(Continued)

*Primary Examiner* — Eric Yen
(74) *Attorney, Agent, or Firm* — Wolf, Greenfield & Sacks, P.C.

(57) ABSTRACT

A method for enhancing voice interactions within a portable multimodal computing device using visual messages. A multimodal interface can be provided that includes an audio interface and a visual interface. A speech input can then be received and a voice recognition task can be performed upon at least a portion of the speech input. At least one message within the multimodal interface can be visually presented, wherein the message is a prompt for the speech input and/or a confirmation of the speech input.

7 Claims, 2 Drawing Sheets

U.S. PATENT DOCUMENTS

| | | | |
|---|---|---|---|
| 6,424,357 B1* | 7/2002 | Frulla et al. | 715/728 |
| 6,430,174 B1 | 8/2002 | Jennings et al. | |
| 6,601,029 B1* | 7/2003 | Pickering | 704/257 |
| 6,834,264 B2* | 12/2004 | Lucas et al. | 704/235 |
| 6,944,474 B2 | 9/2005 | Rader et al. | 455/550.1 |
| 7,028,306 B2* | 4/2006 | Boloker et al. | 719/310 |
| 7,054,818 B2* | 5/2006 | Sharma et al. | 704/270 |
| 7,200,559 B2* | 4/2007 | Wang | 704/257 |
| 7,212,971 B2* | 5/2007 | Jost et al | 704/275 |
| 7,412,382 B2* | 8/2008 | Noda et al. | 704/233 |
| 7,487,096 B1* | 2/2009 | Cox et al. | 704/277 |
| 2001/0047263 A1 | 11/2001 | Smith et al. | |
| 2002/0062216 A1 | 5/2002 | Guenther et al. | |
| 2002/0069071 A1 | 6/2002 | Knockeart et al. | |
| 2002/0080927 A1 | 6/2002 | Uppaluru | |
| 2002/0103651 A1 | 8/2002 | Alexander et al. | |
| 2002/0152255 A1 | 10/2002 | Smith, Jr. et al. | |
| 2002/0194011 A1* | 12/2002 | Boies et al. | 705/1 |
| 2003/0023435 A1* | 1/2003 | Josephson | 704/235 |
| 2003/0037243 A1* | 2/2003 | Gruteser et al. | 713/185 |
| 2004/0127198 A1* | 7/2004 | Roskind et al. | 455/412.2 |

FOREIGN PATENT DOCUMENTS

| | | |
|---|---|---|
| EP | 1 209 660 | 11/2002 |
| JP | 10301675 | 11/1998 |
| WO | WO 03/030148 | 4/2003 |

OTHER PUBLICATIONS

Allen, G.O., "But Can They Hear It?", MSDN Library, (Jul. 1999).

Himberg, J., et al., "Time Series Segmentation for Context Recognition in Mobile Devices", IEEE, pp. 203-210, (2001).

Hienz, H., et al., "Multimodal Human-Computer Communication in Technical Applications," Proc. of HCI Int., vol. 1, 1999.

Yoshioka, O., et al., "An Address Data Entry System With a Multimodal Interface Including Speech Recognition", Systems and Computers in Japan, vol. 30, No. 9, pp. 64-73, Aug. 1999.

* cited by examiner

METHOD OF ENHANCING VOICE INTERACTIONS USING VISUAL MESSAGES

BACKGROUND OF THE INVENTION

1. Technical Field

The present invention relates to the field of speech recognition and, more particularly, to voice interactions within multimodal interfaces.

2. Description of the Related Art

Computing devices containing multimodal interfaces have been proliferating. A multimodal interface as used herein refers to an interface that includes both voice processing and visual presentation capabilities. For example, numerous cellular telephones can include a graphical user interface and be capable of responding to speech commands and other speech input. Other multimodal devices can include personal data assistants, notebook computers, video telephones, teleconferencing devices, vehicle navigation devices, and the like.

Traditional methods for vocally interacting with multimodal devices typically involve first audibly prompting a user for speech input. Responsive to this prompting, the device receives a requested speech input. Next, an audible confirmation of the speech input can be presented to the user. Such vocal interactions can be slow due to the need to serially relay messages between the user and the multimodal devices. The inefficiency of audible prompting and confirmation can result in considerable user frustration and dissatisfaction.

For example, a user of a multimodal device can be audibly prompted to "speak the name of a departure city." The user can then speak a city name followed by a confirmation response, such as "You entered Boston, is that correct?" The user then responds and another speech input prompt will be audibly presented to the user. Such interactions, typical of conventional systems, fail to utilize the visual capabilities of the multimodal device.

SUMMARY OF THE INVENTION

The invention disclosed herein provides a method, a system, and an apparatus for enhancing voice interactions using visual messages. In particular, a multimodal interface with both voice recognition and visual presentation capabilities can be provided that includes an input element for receiving speech input. Then, visual prompts for the speech input and/or visual confirmations of the speech input can be selectively presented. In one embodiment, user established preferences can determine whether visual prompting and/or confirmations are presented within the multimodal interface. Consequently, the present invention can be used to facilitate voice interaction in multimodal interfaces by eliminating the need for audible prompts, audible confirmations, or both.

One aspect of the present invention can include a method for enhancing voice interactions within a portable multimodal computing device using visual messages. The method can include providing a multimodal interface that includes an audio interface and a visual interface. A speech input can be received and a voice recognition task can be performed upon the speech input. At least one message within the multimodal interface can be visually presented, wherein the message is a prompt for the speech input and/or a confirmation of the speech input. In one embodiment, a visual prompt for the speech input can initially appear within the multimodal interface, the speech input can responsively be received, and a visual confirmation of the speech input can thereafter be presented. In another embodiment, the visually displayed message can be audibly presented.

In yet another embodiment, a user of the multimodal interface can establish an interface preference. This interface preference can be used to determine whether to visually present the messages. For example, if the interface preference establishes that visual prompting should occur, then visual prompts can be presented within the multimodal interface. Otherwise, audible prompts for the speech input can be presented. In another example where the interface preference establishes that visual confirmations should occur, received speech input can be visually confirmed within the multimodal interface. Otherwise, confirmation can be audibly provided. In one embodiment, the identity of the user of the multimodal interface can be determined and interface preferences can be received from a data store based upon the user identity.

Additionally, a visual and/or acoustic characteristic of the multimodal interface environment can be ascertained. This characteristic can determine whether the visual prompts and/or visual confirmations are presented within the multimodal interface.

For example, if the environment is too noisy for audible prompts to be easily heard, then visual prompts can be presented. In another embodiment, an exception can be established against an item within the multimodal interface, wherein the exception can override interface preferences with regards to the item. Accordingly, the presentation of one or more visual and/or audio messages can be determined based upon the exception.

Another aspect of the present invention can include a system for enhancing voice interactions using visual messages. The system can include a means for identifying a multimodal interface that includes speech recognition and visual presentation capabilities, a means for presenting an input element within the multimodal interface, a means for receiving a speech input associated with the input element, and a means for visually presenting at least one message within the multimodal interface. The message can be a prompt for the speech input and/or a confirmation of the speech input.

BRIEF DESCRIPTION OF THE DRAWINGS

There are shown in the drawings embodiments, which are presently preferred, it being understood, however, that the invention is not limited to the precise arrangements and instrumentalities shown.

DETAILED DESCRIPTION OF THE INVENTION

The invention disclosed herein provides a method, a system, and an apparatus for enhancing voice interactions using visual messages. The voice interactions can occur via a multimodal interface that includes an input element for receiving speech input. One or more visual messages can be presented within the multimodal interface to prompt and/or confirm speech input. In one embodiment, user preferences can control whether visual prompts and/or confirmations are presented. In another embodiment, environmental and situational factors, such as the noise level and/or privacy requirements of the multimedia interface, can determine whether visual prompts and/or confirmations are presented.

Figure 1:
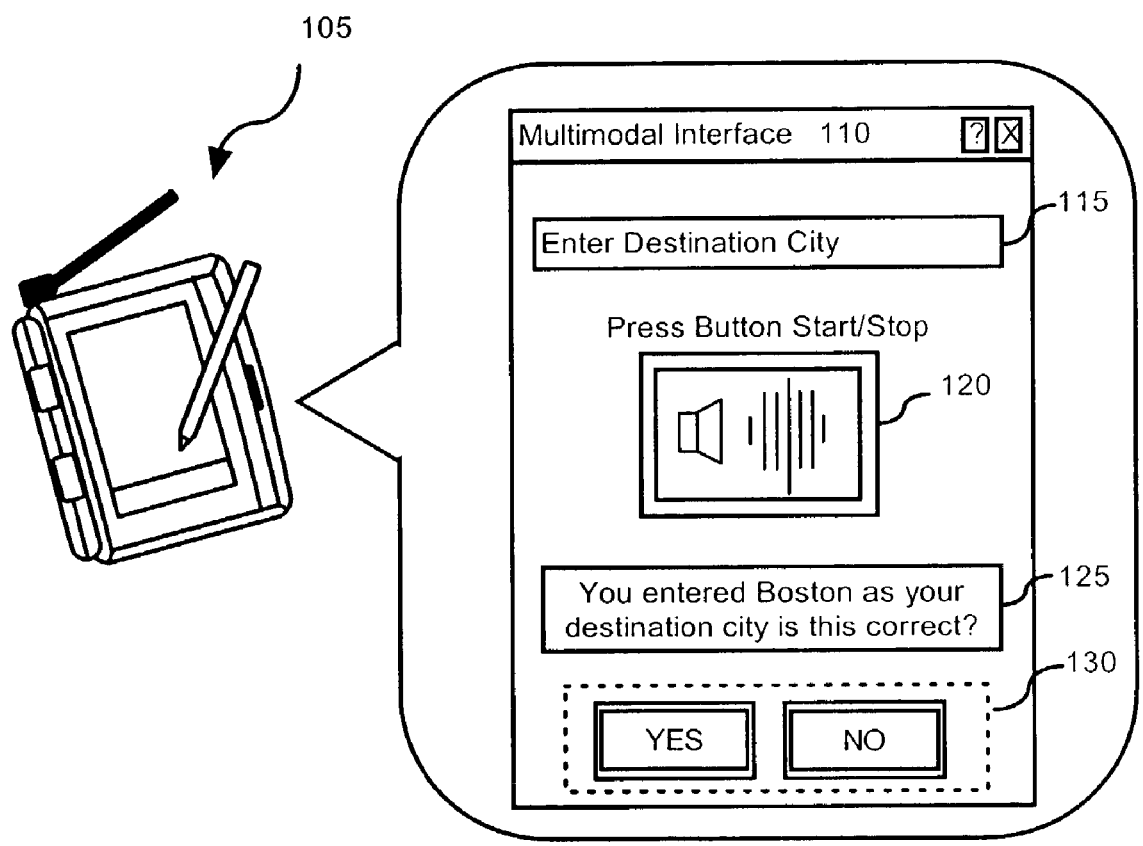
FIG. 1 is a schematic diagram illustrating a system for enhancing voice interactions using visual messages in accordance with the inventive arrangements disclosed herein.

FIG. 1 is a schematic diagram illustrating a system for enhancing voice interactions using visual messages in accordance with the inventive arrangements disclosed herein. The system can include a multimodal computing device 105 having a multimodal interface 110. The multimodal computing device 105 can be any device that includes an audio interface for performing speech recognition functions and a visual interface with visual presentation capabilities.

For example, the multimodal computing device 105 can include, but is not limited to, a personal data assistant (PDA) equipped with a microphone, a cellular telephone with a display screen, a computing tablet, a personal computer, and a vehicle navigation system. The multimodal computing device 105 can also be a series of connected computing devices with both audio and visual interfaces, such as a telephone communicatively linked to a liquid crystal display, or a teleconference device linked to a television. The speech recognition capabilities of the multimodal computing device 105 can be remotely or locally located. For example, the speech recognition capabilities for a cellular telephone can reside within a voice recognition network element that is communicatively linked to the cellular telephone. Alternately, a personal data assistant can have embedded speech recognition capabilities.

The multimodal interface 110 can include a prompt 115, an input element 120, a confirmation 125, and a confirmation response 130. The prompt 115 can include a message that conveys a request to which a user can vocally respond. The prompt 115 can include a visual message, an audible message, or both a visual and an audible message. For example, the prompt 115 can be a text box, visually presented within the multimodal interface 110 that contains an inquiry for user input. The prompt 115 is not limited to text, however, and can include any of a variety of elements presentable within the multimodal interface 110, such as graphical, video, audio, and multimedia elements.

The input element 120 can represent an interface item reserved for receiving speech input. In one embodiment, the input element 120 can be an indicator, such as a blinking light, signifying that the multimodal computing device 105 is ready to receive speech input. The input element 120 can also be a selectable visual interface item, such as a button, used to signify the beginning and the termination of speech input. The input element 120, however, need not be visually displayed at all. Instead, an audio indicator, such as a beep, can indicate that the device is in a state where speech can be received.

The confirmation 125 can provide a notification mechanism used to confirm that the speech input was properly processed. For example, an audio chime can be selectively played via the audio interface to indicate whether speech input was properly received. In another example, a visual indicator, such as a screen flashing or button blinking can function as the notification mechanism. Additionally, the confirmation 125 can be an audio or visual message repeating at least a portion of the speech input. For example, the confirmation 125 can be a text box displaying the results of a speech recognition process. Like the prompt 115, the confirmation 125 is not limited to containing text, however, and can include any of a variety of elements presentable within the multimodal interface 110, such as graphical, video, audio, and multimedia elements.

When the confirmation 125 repeats the speech input, a confirmation response 130 can be required to verify that the repeated speech is correct. For example, the confirmation response 130 can include two user-selectable buttons located within the visual interface of the multimodal device 105, one for an affirmative confirmation response and the other for a negative response. In another example, the confirmation response 130 will be a speech input, such as "Yes" or "No." Alternatively, the confirmation response 130 can be any detectable event, such as the pressing of a key on a touch-tone keypad, a hang-up event, and/or the passing of a time-out condition.

It should be noted that the multimodal interface 110 can include an interface (not shown) that allows users to establish interface preferences, which can alter the behavior of the multimodal interface 110. For example, one interface preference can enable or disable visual prompting for speech input. Another interface preference can enable or disable visual confirmation of speech input. Other interface preferences can enable or disable audible prompting and audible confirmations. In one embodiment, settings can exist which allow the multimodal interface 110 to present both visual and audible messages for the same events.

In another embodiment, interface preferences can exist which situationally alter the behavior of the multimodal interface 110. These interface preferences can result in dynamic and/or static behavior. For example, dynamic behavior can include adjusting either acoustic and/or visual characteristics of the system based upon conditions within the surrounding acoustic environment. Accordingly, if the acoustic environment is too loud, so that audible signals cannot be easily heard, then visual prompting and visual confirmation features can be enabled. Alternately, audible messages can be inappropriate in quiet environments, such as in a library or at a theatre, and interface preferences can exist that disable audible messages whenever predefined conditions are detected. The acoustic environment can be determined by sampling for background noise and comparing the sampled noise level with a predetermined noise threshold.

Static behavior can include adjustable exception handling for special circumstances. Exceptions can be established for individual items within the multimodal interface 110 resulting in behavior that overrides other, more generic, interface settings. Exceptions can result in the establishment or disablement of audible and/or visual messages for selected items regardless of how other preferences are configured. For example, a peculiar prompt and/or confirmation message within an application can relate to credit card information that a user does not want presented. Accordingly, for that item, an exception condition can be established that disables audio and/or visual confirmations relating to the credit card information.

In operation, a visual prompt 115 for information, such as a prompt for the name of a destination city for a desired airline flight, can be displayed within the multimodal interface 110 to a user of the multimodal computing device 105. Simultaneously, an audio signal also prompting the user for the airline destination can be produced by the multimodal computing device 105. For example, the multimodal device 110 can emit a beep to attract the user's attention. Alternatively, the multimodal device 110 can audibly prompt for a destination city using synthesized speech in conjunction with the visual prompt 115. The user can then speak a response into a microphone of the multimodal computing device 105 and/or enter a response via the GUI of the multimodal interface 110. The user's response can be processed by the multimodal computing device 105. Once internally processed, the user can be provided with a visual confirmation 125 displaying the user's response as understood by the multimodal computing device 105. Because no audible confirmation is required, the interaction between the user and the multimodal computing device 105 can be performed much more expeditiously than conventional systems that require audible confirmations. The user can then provide a confirmation response 130 via a GUI entry and/or a speech response.

Figure 2:
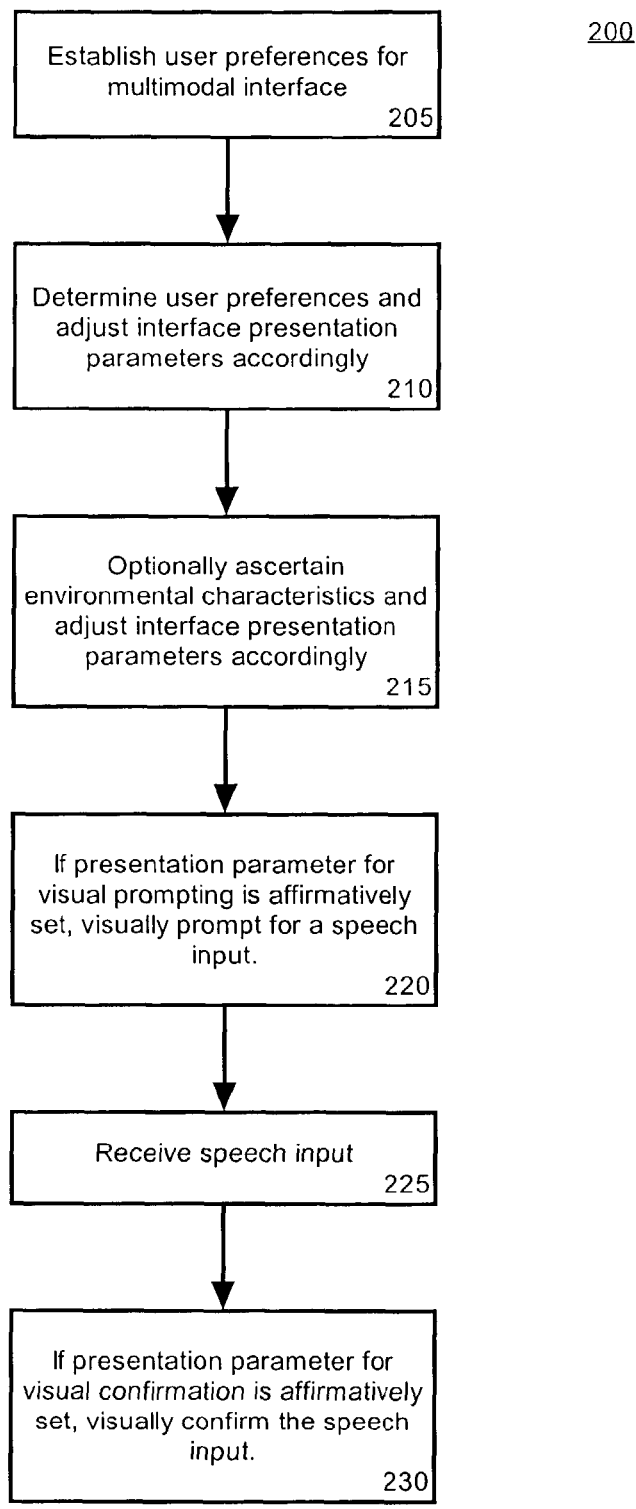
FIG. 2 is a flow chart illustrating a method for enhancing voice interactions utilizing visual messages using the system of FIG. 1.

FIG. 2 is a flow chart illustrating a method 200 of using the system of FIG. 1. The method 200 can be performed in the context of a multimodal interface with both an audio interface for speech recognition tasks and a visual interface for visual presentations. Method 200 can allow the visual capabilities of the multimodal interface to be leveraged in order to facilitate voice interactions between users and multimodal computing devices. The method can begin in step 205 where a user can establish preferences for the multimodal interface. In one embodiment, these preferences can be systematically queried each time a user establishes a new interface session. In another embodiment, preferences can be established and stored for later use. In such an embodiment, the preferences can be device-dependant or user-specific. Device-dependant preferences can be applied to the multimodal interface for all users of the device. User-specific preferences can be applied based on the identify of a user. In a further embodiment, default options can be applied whenever custom preferences have not been established.

In step 210, once user preferences have been determined, interface presentation parameters can be modified according to the established preferences. Interface presentation parameters can determine whether the interface presents visual messages, audible messages, or both. Messages in this context include prompting for speech input and/or confirming received speech input. In step 215, environmental characteristics can be optionally ascertained. That is, some embodiments can allow environmental considerations, such as noise level and privacy considerations, to affect the interface environment. Such embodiments can detect predefined conditions pertaining to the environment of the multimodal interface and adjust interface presentation parameters accordingly.

For example, one embodiment can include a courtesy preference that prevents audible prompting whenever a sampled noise level is below a predetermined threshold. Accordingly, audible prompts will not be presented when the user of the system is in a designated 'quiet' area, such as a library. In a further example, the courtesy preference can re-enable audible prompts, even when environmental noise is below the predetermined threshold, whenever earphones are connected to a device on which the multimodal interface resides. Similarly, a security parameter can be established that disables confirmation responses so that sensitive information is not dispersed to bystanders. For example, if a credit card number is inputted, both visual and audible confirmations can be disabled to prevent the inadvertent dissemination of the credit card number.

In step 220, if the presentation parameter for visual prompting is affirmatively set, the interface can visually prompt for a speech input. The visual prompting can occur in place of or in addition to audible prompting. Further, visual prompting can include text messages as well as any other visually renderable object, such as graphics, charts, video, maps, and the like. In step 225, the speech input can be received. This input can be obtained from an input device, such as an embedded or a peripherally attached microphone. Alternately, the speech input can be contained within a stored audio file, such as an mp3 (MPEG-1 Audio Layer-3) or a wav (Wave) file. Stored audio files can be useful in embodiments that enable users to audibly predefine common responses. For example, a user can have credit card numbers, passwords, addresses, and the like stored as audio files that can be selectively provided as speech input responses.

In step 230, if the presentation parameter for visual confirmation is affirmatively set, the multimodal interface can visually confirm the speech input. The visual confirmation can occur in place of or in addition to audible confirmation. Further, visual confirmation can include text messages as well as any other visually renderable object, such as graphics, charts, video, maps, and the like. In one embodiment, the user can confirm that the speech input was correctly interpreted. If not, the user can be prompted to re-enter the speech input. If so, the method can terminate or proceed by prompting for another speech input.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for use with a multimodal computing device capable of displaying visual messages comprising the steps of:
   providing a multimodal interface that includes an audio interface and a visual interface;
   sampling for a background noise to produce a sampled noise level;
   comparing the sampled noise level with a first predetermined noise threshold;
   in response to determining that the sampled noise level is above the first predetermined noise threshold, enabling interaction with the user via the visual interface by providing at least one visual prompt for user input;
   comparing the sampled noise level with a second predetermined noise threshold; and
   in response to determining that the sampled noise level is below the second predetermined noise threshold:
      disabling interaction with the user via the audio interface;
      enabling interaction with the user via the visual interface;
      determining whether earphones are connected to the multimodal computing device; and
      when it is determined that earphones are connected to the multimodal computing device, re-enabling interaction with the user via the audio interface.

2. The method of claim 1, further comprising:
visually presenting within said multimodal interface a prompt for speech input;
receiving the speech input from the user; and,
visually presenting within said multimodal interface a confirmation of the speech input.

3. The method of claim 1, further comprising the steps of:
identifying an exception against an item within said multimodal interface for a secure transaction, wherein said exception overrides the response to the determination that the sampled noise level is above the first predetermined noise threshold and the response to the determination that the sampled noise level is below the second predetermined noise threshold ; and,
determining whether to present at least one of visual messages, audio messages, and neither the visual nor the audio messages responsive to said exception by:
identifying whether a secure transaction is presented by the multimodal interface, and
when it is determined that a secure transaction is presented by the multimodal interface, disabling at least one of visual messages, audio messages, visual confirmation responses and audible confirmation responses to prevent at least one of a visual presentation and an audible playing of sensitive information.

4. The method of claim 1, further comprising the steps of:
ascertaining an acoustic characteristic of an environment in which said multimodal interface is presented; and, responsive to said ascertaining step, determining whether to audibly present at least one of said messages.

5. The method of claim 2, further comprising receiving a confirmation response in response to the confirmation of the speech input so as to verify the speech input as correct, wherein the confirmation response comprises at least one of a visual confirmation response, an audible confirmation response, and a detectable event.

6. The method of claim 5, further comprising presenting another prompt for the speech input if the confirmation response indicates that the speech input is incorrect.

7. The method of claim 1, wherein the act of enabling, in response to determining that the sampled noise level is above the first predetermined noise threshold, interaction with the user via the visual interface, further comprises:
providing visual confirmation via the visual interface that speech input from the user was successfully received.

* * * * *